(12) United States Patent
Good et al.

(10) Patent No.: US 11,036,912 B2
(45) Date of Patent: Jun. 15, 2021

(54) OVERLAY OPTIMIZATION

(71) Applicant: GLOBALFOUNDRIES U.S. INC., Santa Clara, CA (US)

(72) Inventors: Richard P. Good, Saratoga Springs, NY (US); Ian R. Krumanocker, Troy, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/679,826

(22) Filed: Nov. 11, 2019

(65) Prior Publication Data

US 2021/0141303 A1    May 13, 2021

(51) Int. Cl.
| | |
|---|---|
| *G06F 30/30* | (2020.01) |
| *G03F 1/00* | (2012.01) |
| *G03F 7/00* | (2006.01) |
| *G03F 9/00* | (2006.01) |
| *G06F 30/398* | (2020.01) |
| *G03F 1/36* | (2012.01) |
| *G03F 1/70* | (2012.01) |
| *G06F 30/367* | (2020.01) |
| *G03F 7/20* | (2006.01) |
| *G06F 119/18* | (2020.01) |
| *G06F 111/10* | (2020.01) |

(52) U.S. Cl.
CPC .............. *G06F 30/398* (2020.01); *G03F 1/36* (2013.01); *G03F 1/70* (2013.01); *G03F 7/70633* (2013.01); *G03F 9/70* (2013.01); *G06F 30/367* (2020.01); *G06F 2111/10* (2020.01); *G06F 2119/18* (2020.01)

(58) Field of Classification Search
None
See application file for complete search history.

(56) References Cited

U.S. PATENT DOCUMENTS

| | | | | |
|---|---|---|---|---|
| 8,035,824 B2* | 10/2011 | Ausschnitt | .......... | G03F 7/70608 |
| | | | | 356/636 |
| 10,739,685 B2* | 8/2020 | Buhl | .................... | G03F 7/70558 |
| 10,816,907 B2* | 10/2020 | Ten Berge | .......... | G03F 7/70633 |

OTHER PUBLICATIONS

J. Fenner et al., "Stepper Registration Feedback Control in 300mm Manufacturing," Proc. SPIE vol. 5044, Advanced Process Control and Automation, Jul. 1, 2003, pp. 44-51. (Year: 2003).*
V.M. Martinez et al., "Adaptive on-line estimation and control of overlay tool bias," Proc. SPIE vol. 5044, Advanced Process Control and Automation, Jul. 1, 2003, pp. 52-62. (Year: 2003).*

(Continued)

*Primary Examiner* — Leigh M Garbowski
(74) *Attorney, Agent, or Firm* — Francois Pagette; Andrew M. Calderon; Roberts Calderon Safran & Cole, P.C.

(57) ABSTRACT

The present disclosure generally relates to semiconductor structures and, more particularly, to overlay optimization and methods of manufacture. The method includes performing, by a computing device, an exposure with a correction parameter to a first wafer; performing, by the computing device, a decorrection of the correction parameter; collecting, by the computing device, overlay data in response to the exposure and the decorrection; estimating, by the computing device, an optimal parameter from the overlay data; and applying, by the computing device, the optimal parameter to a second wafer to align an overlay in the second wafer.

20 Claims, 6 Drawing Sheets

(56) References Cited

OTHER PUBLICATIONS

M. Z. Ullah et al., "Overlay Improvement Using Legendre/Zernike Model-Based Overlay Corrections and Monitoring with Interpolated Metric," Proc. SPIE vol. 9424, Metrology, Inspection, and Process Control for Microlithography WWWIX, Mar. 19, 2015, 15 pages. (Year: 2015).*

H. Lee et al., "In-depth analysis of sampling optimization methods," Proc. SPIE vol. 9778, Metrology, Inspection, and Process Control for Microlithography XXX, Mar. 8, 2016, 21 pages. (Year: 2016).*

G. Krause et al., "Geometry-based across wafer process control in a dual damascene scenario," Proc. SPIE vol. 10585, Metrology, Inspection, and Process Control for Microlithography XXXII, Mar. 13, 2018, 12 pages. (Year: 2018).*

N. Aung et al., "Overlay control for 7 nm technology node and beyond," Proc. SPIE vol. 10587, Metrology, Inspection, and Process Control for Microlithography XXXI, Mar. 20, 2018, 13 pages (Year: 2018).*

ZhiJeng Gan et al., "The Optimization of Overlay Control for Beyond Sub-40NM Lithography Processes", Shanghai Huali Microelectronics Corporation, Shanghai, Mar. 2012, China, 2015, 3 pages.

Yung-Yao Lee et al., "Photolithography Run-To-Run Metrology Control Using Multiple Algorithms for Mass Production Enhancement", No. 19 Li Hsin Rd., Hsinchu Science Park, Hsinchu, Taiwan, 2008, 4 pages.

Yibo Jiao et al., "Stochastic Control of Multilayer Overlay in Lithography Processes", IEEE Transactions on Semiconductor Manufacturing, vol. 24, No. 3, Aug. 2011, 14 pages.

Chen-Fu Chien et al., "Overlay Error Compensation Using Advanced Process Control With Dynamically Adjusted Proportional-Integral R2R Controller", IEEE Transactions on Automation Science and Engineering, vol. 11, No. 2, Apr. 2014, 12 pages.

Miguel Garcia-Medina et al., "CPE Run-to-Run Overlay Control for High Volume Manufacturing", KLA-Tencor Corp 1 Technology Drive Milpitas, CA, USA, 2015, 5 pages.

* cited by examiner

OVERLAY OPTIMIZATION

FIELD OF THE INVENTION

The present disclosure generally relates to semiconductor structures and, more particularly, to overlay optimization and methods of manufacture.

BACKGROUND

In the fabrication of semiconductor structures, patterns are printed in various layers for the creation of features, along with their respective connections, in the build structure. As semiconductor processes continue to scale downwards, e.g., shrink, the desired spacing between the features (i.e., the pitch) also becomes smaller. In this way, any variation from the approved designs can cause issues with the build.

One issue that can occur during fabrication is the misalignment between the patterns in different layers. Specifically, the misalignment in the overlay of patterns can cause various connection failures, thereby reducing yield. Accordingly, this process variability, along with tight specifications needed at shrinking technology nodes, can cause a relatively high amount of lithography rework.

SUMMARY

In an aspect of the disclosure, a method comprises: performing, by a computing device, an exposure with a correction parameter to a first wafer; performing, by the computing device, a decorrection of the correction parameter; collecting, by the computing device, overlay data in response to the exposure and the decorrection; estimating, by the computing device, an optimal parameter from the overlay data; and applying, by the computing device, the optimal parameter to a second wafer to align an overlay in the second wafer.

In an aspect of the disclosure, a computer program product comprises: a computer readable storage medium having program instructions embodied therewith, and the program instructions are readable by a computing device to cause the computing device to: perform an exposure with a correction parameter onto a first wafer; perform a decorrection of the correction parameter; collect overlay data with respect to the decorrection; estimate a first optimal correction parameter from the overlay data for sites on a second wafer; model a result of the first optimal correction parameter to a subset of the sites; estimate a difference for the subset of the sites; and estimate a second optimal correction parameter based on the difference.

In an aspect of the disclosure, a controller for overlay optimization comprises: a CPU, a computer readable memory and a computer readable storage media; first program instructions to determine a registration error at a site-level of a wafer; second program instructions to generate a decorrection from the registration error; third program instructions to apply an estimation function to the decorrection to generate estimated decorrections for a site-level of a second wafer; fourth program instructions to dampen corrections which are to be applied to the estimated decorrections at the site-level of the second wafer; and fifth program instructions to apply the dampened corrections to the estimated decorrections at the site-level of the second wafer, wherein the first, second and third program instructions are stored on the computer readable storage media for execution by the CPU via the computer readable memory.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

Figure 1A:
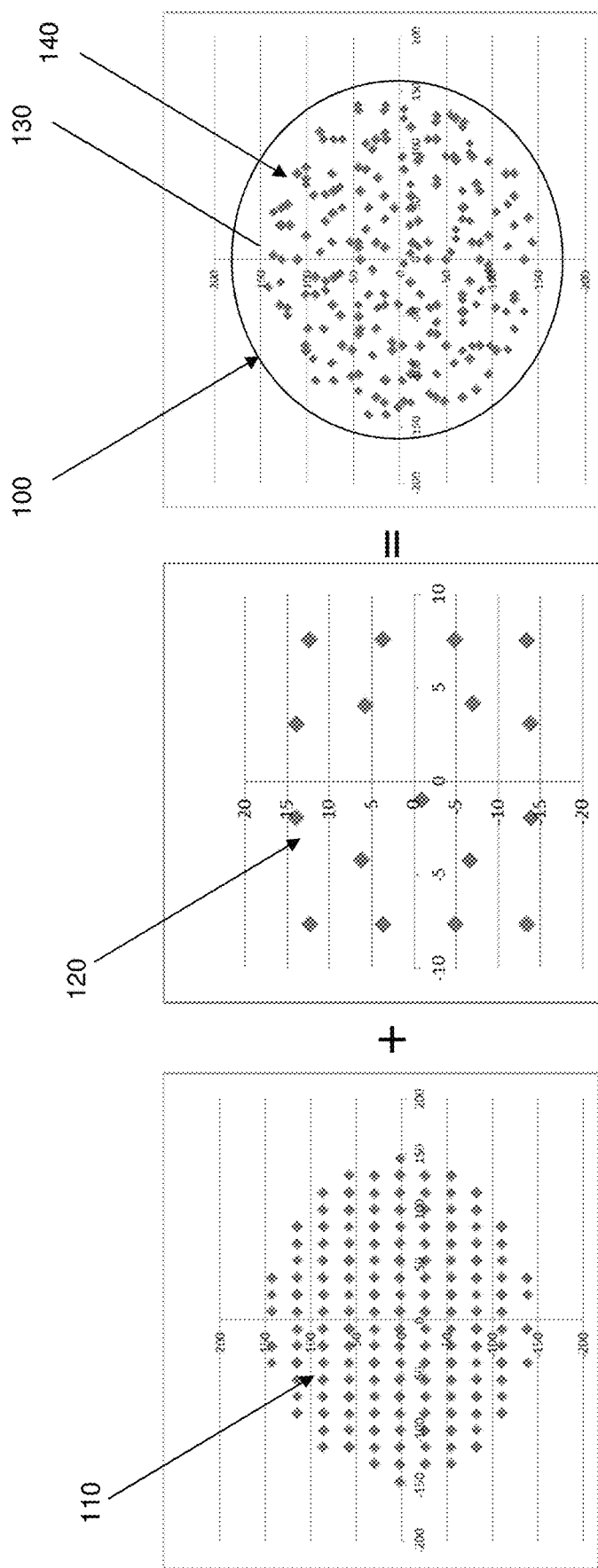
FIGS. 1A-1E show registration errors and corrections, amongst other features, in accordance with aspects of the present disclosure.

The present disclosure generally relates to semiconductor structures and, more particularly, to overlay optimization and methods of manufacture. In embodiments, the structures and processes described herein allow for the accurate alignment of patterns throughout various layers of a device by forecasting and correcting overlay registration at the site-level of the device. Advantageously, the structures and processes described herein reduce overlay variability by performing site-level run-to-run control to ensure accurate alignment between patterns, thereby reducing the amount of lithography rework needed.

The structures and processes described herein address the problem of overlay misalignment by modeling a relationship between site-level decorrections at the feed-forward (FF) and feedback (FB) layers. In embodiments, the model can forecast various decorrections at the site-level, including X-translation, Y-translation and magnification, amongst other decorrections. Accordingly, the model can be used to forecast the site-level decorrections at the FB layer for future fabrication lots. In this way, the processes described herein optimize the overlay by forecasting and correcting overlay registration at the site-level.

The processes described herein include a method for performing overlay optimization, which includes performing an exposure with an initial correction parameter and collecting overlay data. Additionally, the method includes performing a decorrection of the correction parameter, and estimating a first optimal correction parameter. The method also includes modeling the result of the optimal correction for a subset of sites, estimating a remaining delta for the subset of sites and estimating a second optimal correction parameter based on the remaining delta.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

FIGS. 1A-1E illustrate a wafer 100 at a site-level 130 in accordance with aspects of the present disclosure. During the fabrication of semiconductor devices, various layers of the wafer 100 are patterned to form wiring or other features and their respective interconnections. These patterns through the various layers can be laid over one another, which is known as an overlay (OVL).

The site-level 130 of FIG. 1A is a level in the wafer 100 which provides various reference points, i.e., sites 140. Each wafer 100 can have about 70-1000 sites in an active region. Generally, there are about 220 sites in the wafer 100; although any number of sites are contemplated herein. In embodiments, the sites 140 can be in non-device areas of the wafer, e.g., scribe lines.

The sites 140 can be determined and measured from a set of X and Y (XW, YW) wafer coordinates 110 and (XF, YF) field coordinates 120. In this way, every site of the sites 140 has coordinates with respect to the wafer 100, i.e., (XW, YW) wafer coordinates 110 and (XF, YF) field coordinates 120. In embodiments, the sites 140 can serve as a reference point for determining misalignment with respect to the overlay. In this way, the site-level 130 includes sites 140 for referencing overlay errors.

Figure 1B:
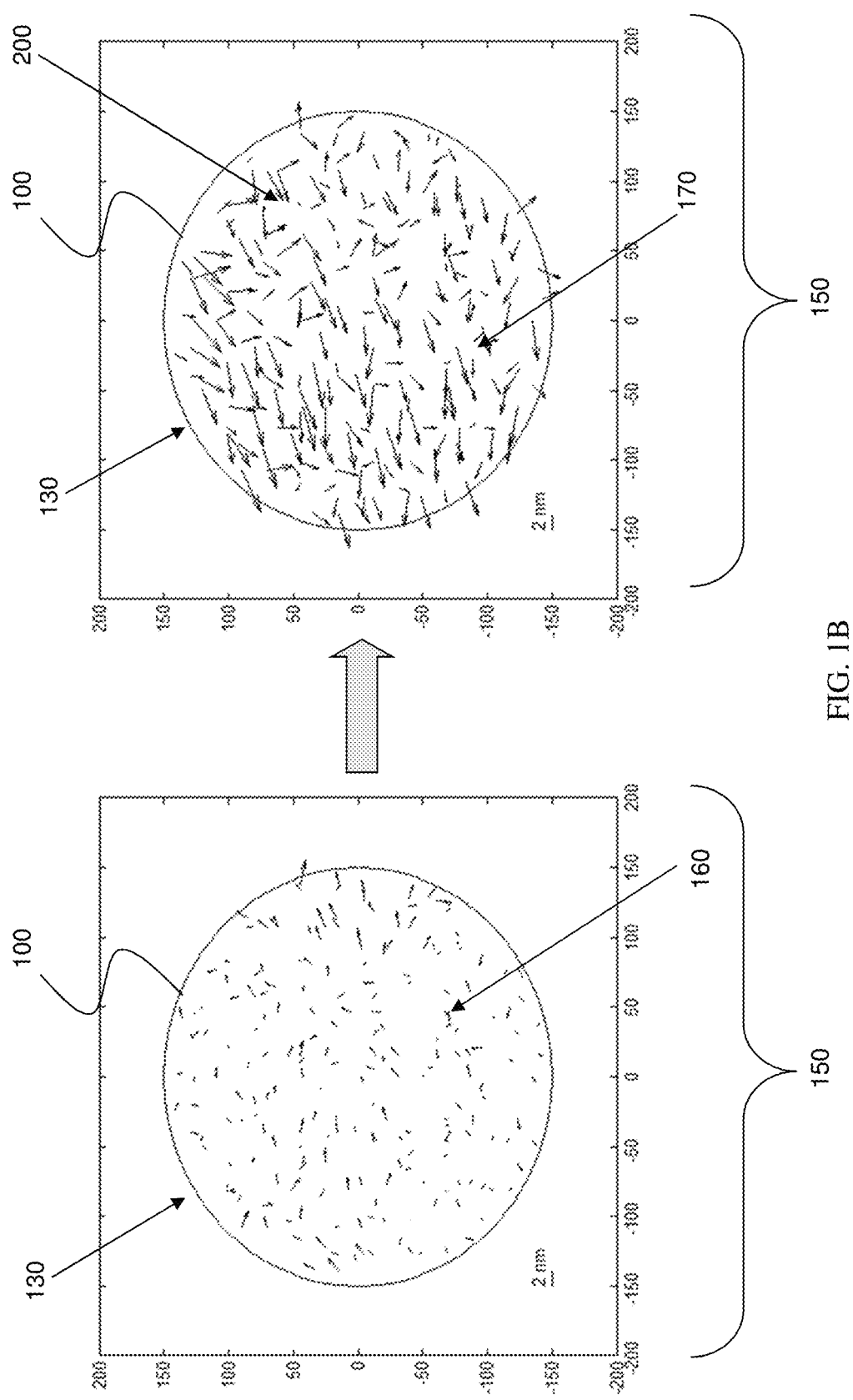

FIG. 1B illustrates a feed-forward (FF) layer 150 at the site-level 130 of the wafer 100. In embodiments, the FF layer 150 is a printed layer which is analyzed in order to provide feed-forward (FF) data 200 for future production lots of wafers. In embodiments, the FF layer 150 is at the site-level 130; however, it is also contemplated that the FF layer 150 be at non-site-levels. In this way, the exposure is at a site-level 130 of a wafer 100.

The FF layer 150 includes a plurality of registration errors 160, which represent a misalignment between patterns in the overlay of the wafer 100. Registration errors 160 indicate that one photolithographic layer is not in registration with at least one of the previous layers of the wafer 100. Accordingly, control over the overlay is desired in order to ensure accuracy in aligning the patterns between the various layers of the wafer 100, i.e., an amount of registration errors 160 is desired to be close to zero, which indicates that the alignment of the overlay is proper, i.e., a good registration. However, in embodiments, the overlay can still be considered functional if the misalignment (shift) is less than 3 nm, for example.

To determine the registration errors 160, various parameters can be analyzed. For example, the registration errors 160 can be compared to the sites 140 of the site-level 130, or another reference layer, depending on the needs of the user. As shown in FIG. 1B, the registration errors 160 can be represented as vectors with a direction and a magnitude, with respect to a corresponding site 140 of the sites 140.

Alternatively, the registration errors 160 can be determined from correction parameters implemented to correct the misaligned overlay. The various correction parameters include parameters with respect to the overlay (OVL), higher order process corrections (HOPC), intrafield higher order process corrections (IHOPC) and corrections per exposure (CPE), amongst other examples. Accordingly, these parameters can indicate how the overlay was corrected in order to be aligned with patterns of other layers. In embodiments, the various correction parameters can be grouped into corrections in the X-axis direction (X Correction) and corrections in the Y-axis direction (Y Correction). The X Correction and Y Correction include linear, HOPC, IHOPC and CPE correction parameters.

Examples of OVL parameters include: X Translation; Y Translation; X Magnification; Y Magnification; Rotation; Non-orthogonality; Field magnification; Field asymmetric magnification; Field rotation; and Field asymmetric rotation. Examples of the IHOPC parameters include: 2nd Order X-magnification; 2nd Order Y-magnification; Trapezoid; X-Bow; Y-Bow; 3rd Order X-magnification; 3rd Order Y-magnification; Accordion; and 3rd order flow. Examples of the CPE parameters include: Per-Field asymmetric magnification; Per-Field asymmetric rotation; Per-Field magnification; Per-Field rotation; Per-Field X-translation; and Per-Field Y-translation. Accordingly, the correction parameter includes at least one of an overlay (OVL) correction, higher order process corrections (HOPC) correction, intrafield higher order process corrections (IHOPC) correction and corrections per exposure (CPE) corrections. Further, the OVL correction includes a Y Translation which represents how much a layer of the first wafer 100 was shifted up or down to correct overlay misalignment.

As an example, the OVL parameter X Translation represents how much a layer in the wafer 100 was shifted to the right or left to correct the misalignment in the overlay, while the OVL parameter Y Translation represents how much a layer was shifted up or down to correct the misalignment in the overlay. Specifically, FIG. 1B illustrates that for the X Translation, the FF layer 150 was shifted to the right or left by 2 nm, i.e., the registration error 160 was 2 nm with respect to a reference point, e.g., site 140. In this way, for subsequent production lots, an overlay correction controller will have data to compensate for the 2 nm shift.

Continuing with FIG. 1B, the registration errors 160 in the FF layer 150 are converted to feed-forward layer decorrections (FF decorrections 170) by setting any correction parameters implemented in the registration errors 160 by setting the correction parameters to a zero value. In this way, the FF decorrections 170 represent a setting where all of the OVL correction parameters, e.g., X Translation, Y Translation, X Magnification, etc., are set to zero. Specifically, the performing the decorrection (FF decorrections 170) of the correction parameter (correction parameters OVL, HOPC, IHOPC and CPE) includes setting the correction parameter to zero. This allows for the generation of the decorrection (FF decorrections 170) from the registration error 160 includes setting the registration error 160 to zero.

By setting the FF decorrections 170 to zero, the FF decorrections 170 can be represented as vectors with each FF decorrection 170 having a direction and magnitude with respect to a corresponding correction. In embodiments, this data of the FF decorrections 170 can be managed by an SQL query, or other data management systems and processes.

Figure 1C:
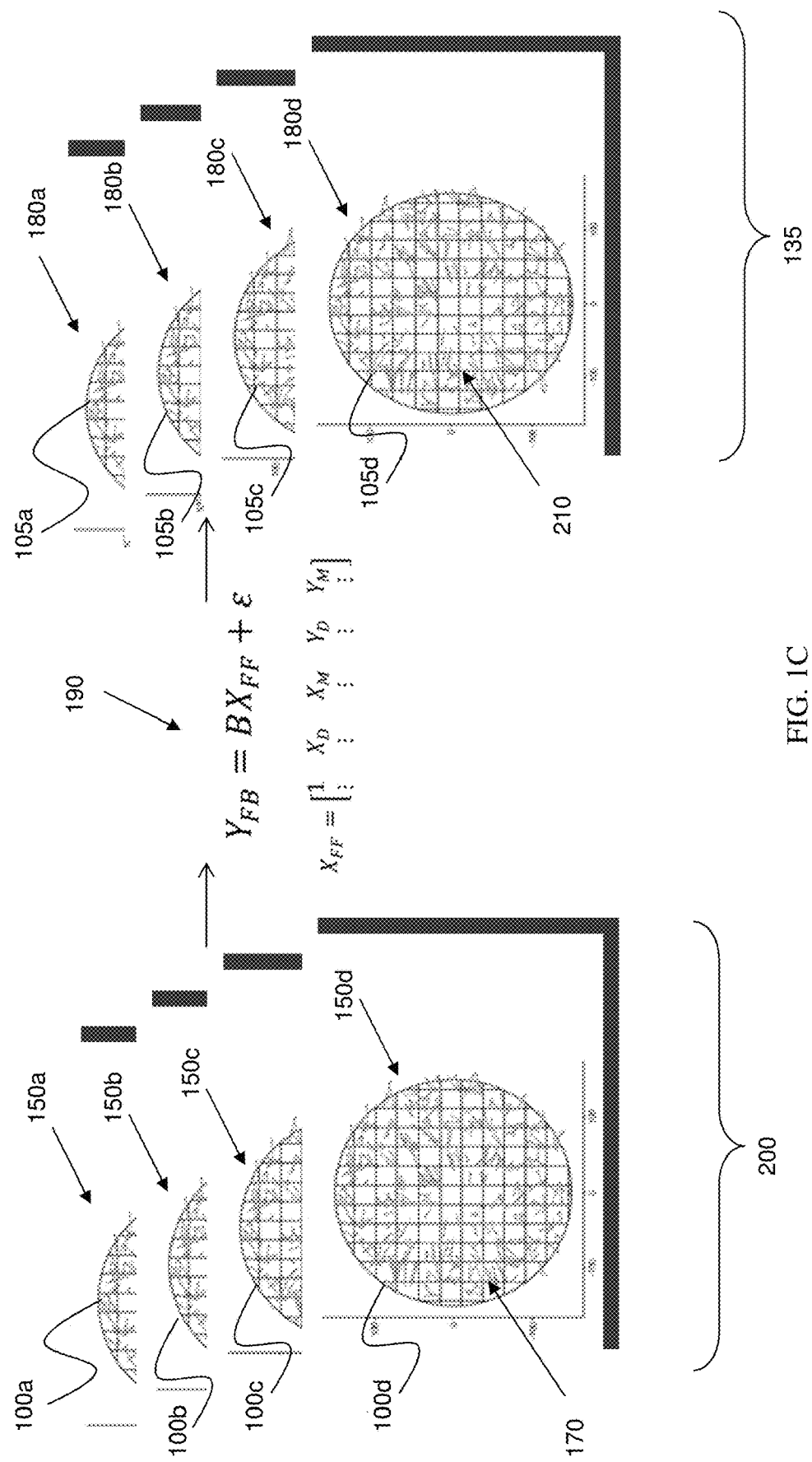

FIG. 1C illustrates an FF layer 150 as FF layers 150a, 150b, 150c, 150d for various wafers 100a, 100b, 100c, 100d. In embodiments, the wafers 100a, 100b, 100c, 100d are from different fabrication lots and include FF decorrections 170 at each of the FF layers 150a, 150b, 150c, 150d. Additionally, wafers 105a, 105b, 105c, 105d from subsequent production lots include a feedback (FB) layer 180, shown as FB layers 180a, 180b, 180c, 180d. In embodiments, the FB layer is a layer of in a wafer, such as wafer 105a, in a subsequent production lot which uses the FF data 200 from the FF layers 150a, 150b, 150c, 150d in order to estimate various decorrections for each of the FB layers 180a, 180b, 180c, 180d.

The FF data 200 can include the registration errors 160 and the various correction parameters OVL, HOPC, IHOPC and CPE which were implemented in the FF layers 150a, 150b, 150c, 150d. In embodiments, the FF data 200 collected from the FF layers 150a, 150b, 150c, 150d provides a reasonable estimation on how the FB layers 180a, 180b, 180c, 180d will run for subsequent fabrication lots. In this way, FF data 200 collected from an FF layer 150 is fed-forward to a subsequent FB layer 180 of another wafer 105 in a subsequent production run.

Continuing to FIG. 1C, an estimation function 190 is implemented at each of the FF layers 150a, 150b, 150c, 150d by taking the FF decorrections 170 from the FF layers 150a, 150b, 150c, 150d and applying a least squares regression in order to estimate data a mean value from the FF decorrections. Specifically, estimation function 190 estimates feedback (FB) decorrections 210 for the FB layer 180, and specifically estimate FB decorrections 210 for each of the FB layers 180a, 180b, 180c, 180d. Accordingly, applying the optimal parameter (FB decorrections 210) to the second wafer 105 occurs at a site-level 140 of the second wafer 105. In this way, estimating the optimal parameter (FB decorrections 210) includes executing a least squares regression on the overlay data (FF data 200).

As noted previously, the FF decorrections 170 represent a setting where all the OVL correction parameters, e.g., X Translation, Y Translation, X Magnification, etc., are set to zero in the FF layer 150. By estimating the FB decorrections 210, it is possible to estimate what the FB layer should look like in order to not have any corrections, i.e., a lack of corrections.

The estimation function 190 can be applied to FF decorrections 170 from each FF layer 150a, 150b, 150c, 150d, of the various wafers 100a, 100b, 100c, 100d in order to estimate feedback (FB) decorrections 210 for each of the FB layers 180a, 180b, 180c, 180d. In embodiments, the estimation function 190 can be a linear least squares regression estimation, represented by the function (1) below:

$$Y_{FB} = BX_{FF} + \varepsilon \quad (1)$$
$$X_{FF} = \begin{bmatrix} 1 & X_D & X_M & Y_D & Y_M \\ \vdots & \vdots & \vdots & \vdots & \vdots \end{bmatrix}$$

In function (1), $Y_{FB}$ represents the estimated FB decorrections 210 desired for the FB layers 180a, 180b, 180c, 180d. Variable B represents a gain variable, while $X_{FF}$ represents the regressors from the FF layer 150. Noise is represented by E, and generally refers to residual noise left over from the least squares regression. In embodiments, it is desired that the gain variable B is to be found at a point with as little noise as possible. In further embodiments, E can be assumed to be zero, i.e., no noise.

The regressors $X_{FF}$ can be represented as a matrix as shown in function (1), with $X_D$ representing FF decorrections 170 in the x-direction, $X_M$ representing measured decorrections in the x-direction of the FF decorrections 170, $Y_D$ representing FF decorrections 170 in the y-direction and $Y_M$ representing measured decorrections in the y-direction of the FF decorrections 170. Optimum coefficients for the gain parameter B are needed for mapping of the FF data 200 to each of the FB layers 180a, 180b, 180c, 180d.

In embodiments, the optimum coefficients can be found using any suitable matrix regression, including singular value decomposition, least squares regression and conjugate gradients, amongst other examples. Further, as shown in function (1), there is a column of 1's in the matrix. The column of 1's indicates that there will be an intercept with at least one of the variables $X_D$, $X_M$, $Y_D$, $Y_M$.

In embodiments, the FB layers 180a, 180b, 180c, 180d are at a site-level 135 of the wafers 105a, 105b, 105c, 105d. The site-level 135 is similar to site-level 130 and includes sites 140 which can serve as reference points. In this way, the FF data 200 reduces overlay variability by performing site-level, i.e., site-levels 130, 135, run-to-run control by mapping the FF data 200 to a site-level 135 of the wafers 105a, 105b, 105c, 105d. Specifically, the structures and processes described herein control overlay by forecasting and correcting overlay registration at the site-level, i.e., site-level 135. However, it is also contemplated herein that the FB layers 180a, 180b, 180c, 180d can at non-site-levels.

Figure 1D:
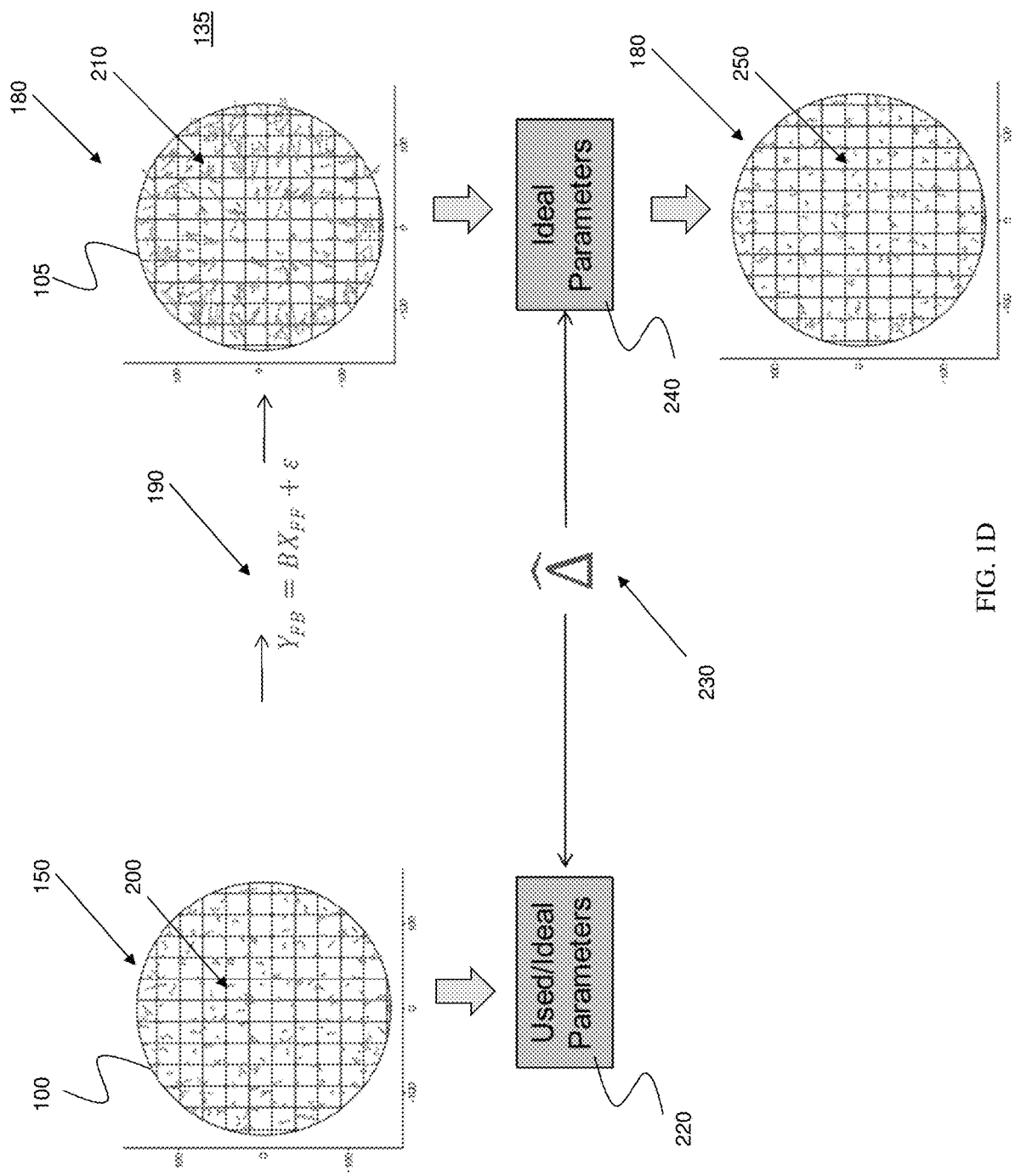

FIG. 1D illustrates corrected FB decorrections 250 generated for the FB layer of the wafer 105, and specifically at the site-level 135 of the wafer 105. The corrected FB decorrections 250 are generated from the estimated FB decorrections 210, along with various correction parameters, i.e., parameters 220, 240. In embodiments, a difference (Δ) 230 is calculated between the used/ideal parameters 220 used to correct the overlay in the FF layer 150 of the wafer 100, and ideal parameters 240, which have been preprogrammed in a controller to correct overlay misalignment in the wafer 105.

The difference 230 between the used/ideal parameters 220 and ideal parameters 240 is then applied to the estimated FB decorrections 210 in order to generate the corrected FB decorrections 250. In this way, the corrected FB decorrections 250 take into account the OVL, HOPC, IHOPC and CPE corrections to further ensure overlay optimization. Accordingly, the corrected FB decorrections 250 represent corrections in order to minimize the overlay. In this way, the structures and processes described herein provide for performing an exposure with a correction parameter (OVL, HOPC, IHOPC and CPE corrections) onto a first wafer 100, and performing a decorrection (FF decorrections 170) of the correction parameter. Additionally, the structures and processes described herein collect overlay data (FF data 200) with respect to the decorrection, and estimate a first optimal correction parameter (FB decorrections 210) from the overlay data (FF data 200) for sites 140 on a second wafer 105. In addition, the structures and processes described herein model a result of the first optimal correction parameter (FB decorrections 210) to a subset of the sites 140, estimate a difference 230 for the subset of the sites 140, estimate a second optimal correction parameter (FB decorrections 250) based on the difference.

Figure 1E:
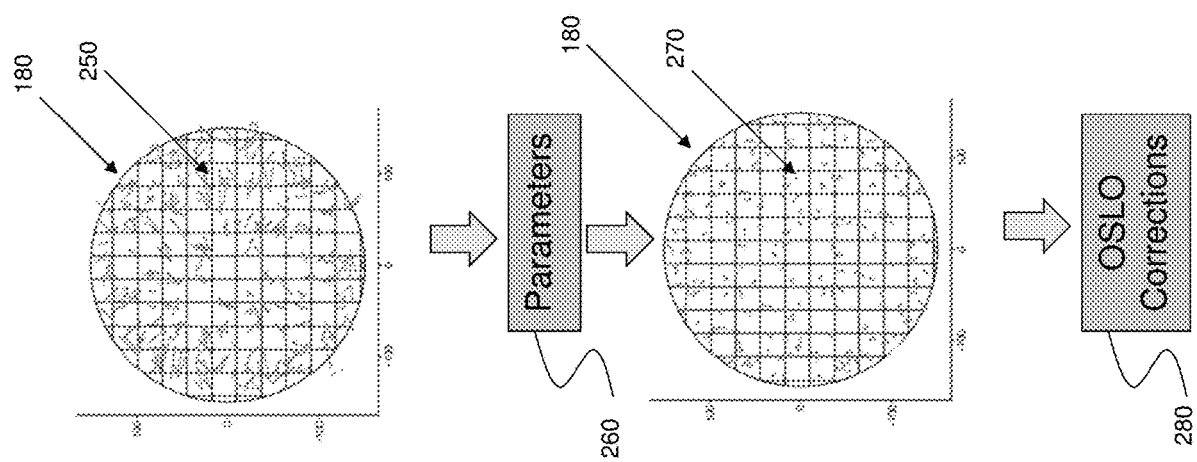

FIG. 1E illustrates residual FB corrections 270. In embodiments, the residual FB corrections 270 are generated by applying corrective parameters 260 to the corrected FB decorrections 250 from the OVL, HOPC, IHOPC and CPE corrections, if further optimization is needed. The process concludes with the application of overlay site-level optimization (OSLO) parameters 280 to the residual FB corrections 270.

The OSLO parameters 280 are corrections to correct any overlay misalignment at the site-level 135, if needed. In this way, the structures and processes described herein reduce overlay variability by performing site-level 130, 135 run-to-run control. Specifically, applying the OSLO parameters 280, along with the above processes, can reduce the amount of lithography rework needed for wafers 100, 105 by about 30%. In addition to the application of the OSLO parameters 280, the residual FB corrections 270 can also have any corrections applied which are preprogrammed into the overlay controller. In embodiments, the OSLO parameters 280 can be dampened by about 30% if need be to further refine the overlay. In this way, the dampened corrections (OSLO parameters 280) are dampened by 30%. Further, the corrections which are dampened include at least one of an OVL correction, an HOPC correction, an IHOPC correction and a CPE correction.

As will be appreciated by one of ordinary skill in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects. Furthermore, aspects of the present disclosure may take the form of a computer program product embodied in one or more computer readable storage medium(s) having computer readable program code embodied thereon.

The computer readable storage medium (or media) having computer readable program instructions thereon causes one or more computing processors to carry out aspects of the present disclosure. The computer readable storage medium can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following non-transitory signals: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. The computer readable storage medium is not to be construed as transitory signals per se; instead, the computer readable storage medium is a physical medium or device which stores the data. The computer readable program instructions may also be loaded onto a computer, for execution of the instructions, as shown in FIG. 7.

Figure 2:
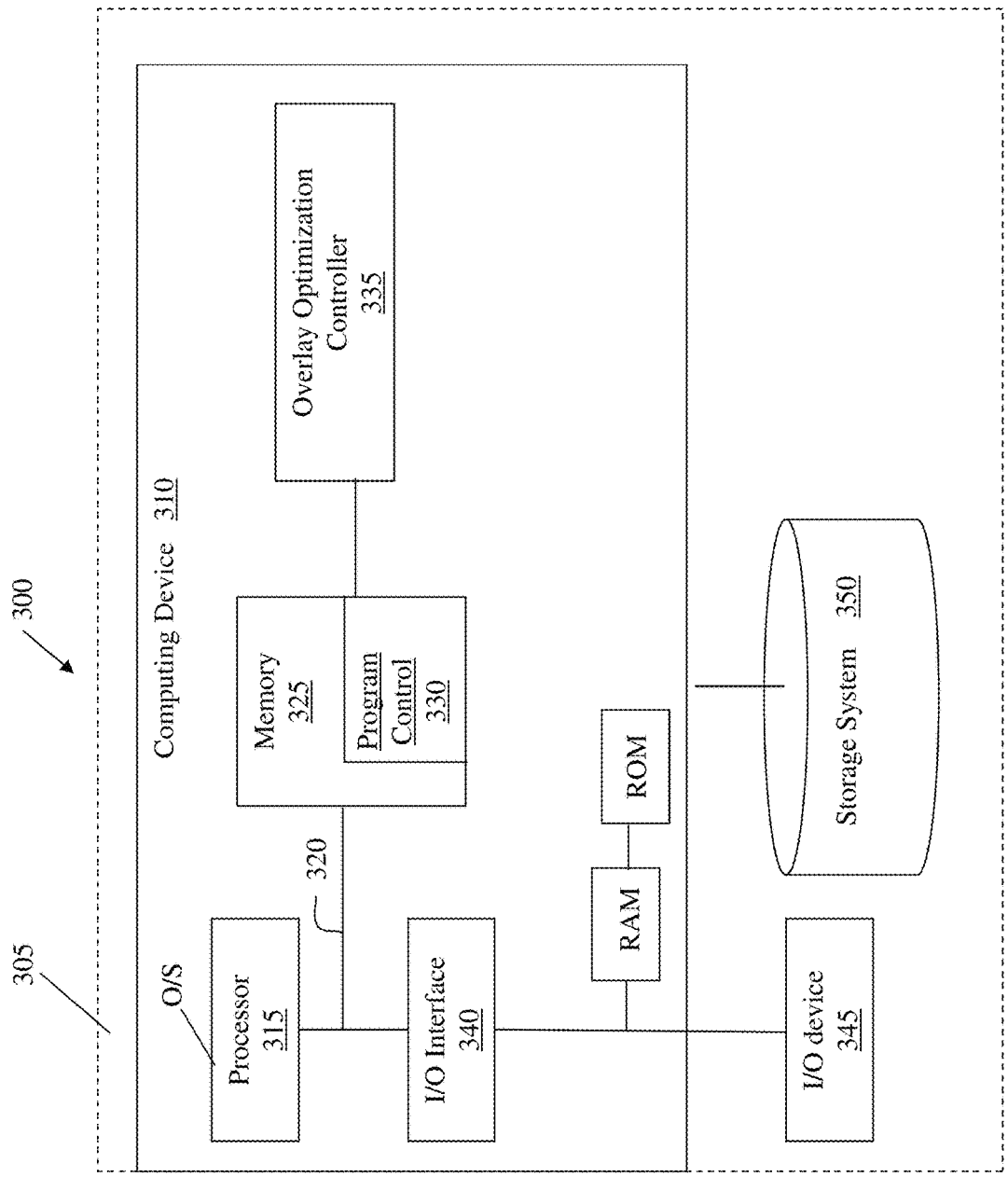
FIG. 2 shows an illustrative infrastructure for implementing overlay site-level optimization in accordance with aspects of the invention.

FIG. 2 shows a computer infrastructure 300 for implementing the steps in accordance with aspects of the disclosure. To this extent, the infrastructure 300 can implement the overlay analysis and decorrections and corrections to the FB layer 180 of the wafer 105 of FIGS. 1C-1E. The infrastructure 300 includes a server 305 or other computing system that can perform the processes described herein. In particular, the server 305 includes a computing device 310. The computing device 310 can be resident on a network infrastructure or computing device of a third-party service provider (any of which is generally represented in FIG. 2).

The computing device 310 includes a processor 315 (e.g., CPU), memory 325, an I/O interface 340, and a bus 320. The memory 325 can include local memory employed during actual execution of program code, bulk storage, and cache memories which provide temporary storage of at least some program code in order to reduce the number of times code which are retrieved from bulk storage during execution. In addition, the computing device includes random access memory (RAM), a read-only memory (ROM), and an operating system (O/S).

The computing device 310 is in communication with external I/O device/resource 345 and storage system 350. For example, the I/O device 345 can comprise any device that enables an individual to interact with computing device 310 (e.g., user interface) or any device that enables computing device 310 to communicate with one or more other computing devices using any type of communications link. The external I/O device/resource 345 may be for example, a handheld device, PDA, handset, keyboard etc.

In general, processor 315 executes computer program code (e.g., program control 730), which can be stored in memory 325 and/or storage system 350. Moreover, in accordance with aspects of the invention, program control 330 controls an overlay optimization controller 335, which performs the registration error 160 analysis, the implementations and analysis of the decorrections 170, 210, the collection and application of the FF data 200, and the OVL, HOPC, IHOPC and CPE corrections along with the OSLO parameters applied to the wafers 100, 105, amongst other examples. The overlay optimization controller 335 can be implemented as one or more program codes in program control 330 stored in memory 325 as separate or combined modules. Additionally, the overlay optimization controller 335 may be implemented as separate dedicated processors or a single or several processors to provide the function of this tool. While executing the computer program code, the processor 315 can read and/or write data to/from memory 325, storage system 350, and/or I/O interface 340. The program code executes the processes of the invention. The bus 320 provides a communications link between each of the components in computing device 310.

The overlay optimization controller 335 is utilized to identify the intended design and correct any overlay to match the intended design. The overlay optimization controller 335 initiates the analysis of the registration errors 160 in order to determine the FF decorrections 170. Specifically, the overlay optimization controller 335 sets the corrections of the FF layer 150 to zero to generate the FF decorrections 170. In this way, a controller 335 for overlay optimization, includes a CPU (processor 315), a computer readable memory (RAM and ROM) and a computer readable storage media (storage system 350). Further, the controller 335 includes first program instructions to determine a registration error 160 at a site-level 130 of a wafer 100, and second program instructions to generate a decorrection (FF decorrections 170) from the registration error 160. Further, the controller 335 includes third program instructions to apply an estimation function 190 to the decorrection to generate estimated decorrections (FB decorrections 210) for a site-level 135 of a second wafer 105. Additionally, the controller 335 includes fourth program instructions to dampen corrections (OSLO parameters 280) which are to be applied to the estimated decorrections (FB decorrections 270) at the site-level 135 of the second wafer 105, and fifth program instructions to apply the dampened corrections (OSLO parameters 280) to the estimated decorrections (FB decorrections 270) at the site-level 135 of the second wafer 105.

By comparing overlay misalignment with the sites 140 of the site-level 130, and the OVL, HOPC, IHOPC and CPE corrections implemented, the overlay optimization controller 335 can determine the registration errors 160 at the site-level 130 of the wafer 100. Further, the overlay optimization controller 335 generates the FF decorrections 170 by setting the OVL, HOPC, IHOPC and CPE corrections to zero. The overlay optimization controller 335 then generates the FF data 200 by including the registration errors 160 and the various correction parameters OVL, HOPC, IHOPC and CPE which were implemented in the FF layer 150.

The overlay optimization controller 335 applies the estimation function 190 to estimate the estimated FB decorrections 210 of the FB layer 180. Then, the overlay optimization controller 335 corrects the estimated FB decorrections 210 by applying various corrections of the OVL, HOPC, IHOPC and CPE corrections. Specifically, the overlay optimization controller 335 calculates a difference (A) 230 between the used/ideal parameters 220 used by the overlay optimization controller 335 to correct the overlay in the FF layer 150 of the wafer 100, and ideal parameters 240 preprogrammed within the overlay optimization controller 335.

The difference 230 between the used/ideal parameters 220 and ideal parameters 240 is then applied by the overlay optimization controller 335 to the estimated FB decorrections 210 in order to generate the corrected FB decorrections 250. Then, the overlay optimization controller 335 generates residual FB corrections 270 by applying corrections to the corrected FB decorrections 250 from the OVL, HOPC, IHOPC and CPE corrections. Additionally, the overlay optimization controller 335 applies the OSLO parameters 280 to correct any overlay misalignment at the site-level 135 remaining, if needed. In this way, the overlay optimization controller 335 reduce overlay variability by doing site-level 130, 135 run-to-run control.

As an example, several lots of wafers, e.g., Lot A through Lot E, are already processed, while a subsequent lot, e.g., Lot F, is to be processed. Specifically, Lot A through Lot E have already run at the FF and FB layers, i.e., FF layers 150a, 150b, 150c, 150d and FB layers 180a, 180b, 180c, 180d. Each lot of the Lot A through Lot E has 220 sites, with each site having an X-direction and a Y-direction. Accordingly, 220 sites*2 directions equals to 2200 total measurements. In this way, Lot A through Lot E provide various correction parameters OVL, HOPC, IHOPC and CPE to allow for a calculation of the expected decorrections, i.e., FB decorrections 210, for Lot F. As a specific example, the various correction parameters from Lot A through Lot E can be about 10 OVL+9 iHOPC+10 HOPC+6 CPE*130 fields*5 wafers equals to 4045 correction parameters.

From these correction parameters the expected decorrections, i.e., FB decorrections 210, can be calculated for each chamber of the current Lot F. As a specific example, 220 sites*2 direction (X and Y)*2 chucks equals to 880 decorrections at the FB layer of the wafer in Lot F. Then, the OSLO corrections, i.e., OSLO parameters 280, can be calculated from the expected FB decorrections. As a specific example, 2 chucks*809 fields equals to 1618 parameters used to correct the wafer in Lot F.

In this way, the structures and processes described herein provide for a method for performing an overlay alignment, which includes performing, by a computing device 310, an exposure with a correction parameter (correction parameters OVL, HOPC, IHOPC and CPE) to a first wafer 100. Additionally, the method includes performing, by the computing device 310, a decorrection (FF decorrections 170) of the correction parameter. Further, the method includes collecting, by the computing device 310, overlay data (FF data 200) in response to the exposure and the decorrection. In addition, the method includes estimating, by the computing device, an optimal parameter (FB decorrections 210) from the overlay data (FF data 200); and applying, by the computing device 310, the optimal parameter (FB decorrections 210) to a second wafer 105 to align an overlay in the second wafer 105.

In further embodiments, the processes described herein include modeling, by the computing device 310, a result of the optimal correction (FB decorrections 210) to a subset of the sites 140. Additionally, the processes described herein include estimating, by the computing device 310, a difference 230 between existing correction parameters (used/ideal parameters 220 and ideal parameters 240) and estimated correction parameters (estimated FB decorrections 210) which are applied to the subset of sites 140. Additionally, the processes described herein include estimating, by the computing device 310, a second optimal correction parameter (corrected FB decorrections 250) based on the difference 230.

The structures of the present disclosure can be manufactured in a number of ways using a number of different tools. In general, though, the methodologies and tools are used to form structures with dimensions in the micrometer and nanometer scale. The methodologies, i.e., technologies, employed to manufacture the structures of the present disclosure have been adopted from integrated circuit (IC) technology. For example, the structures are built on wafers and are realized in films of material patterned by photolithographic processes on the top of a wafer. In particular, the fabrication of the structure uses three basic building blocks: (i) deposition of thin films of material on a substrate, (ii) applying a patterned mask on top of the films by photolithographic imaging, and (iii) etching the films selectively to the mask.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for performing an overlay alignment, comprising:
   performing, by a computing device, an exposure with a correction parameter to a first wafer;
   performing, by the computing device, a decorrection of the correction parameter;
   collecting, by the computing device, overlay data in response to the exposure and the decorrection;
   estimating, by the computing device, a first optimal correction parameter from the overlay data for sites on a second wafer;
   modeling, by the computing device, a result of the first optimal correction parameter to a subset of the sites;
   estimating, by the computing device, a difference for the subset of the sites;
   estimating, by the computing device, a second optimal correction parameter based on the difference; and
   applying, by the computing device, the second optimal correction parameter to the second wafer to align an overlay in the second wafer.

2. The method of claim 1, wherein the performing the decorrection of the correction parameter includes setting the correction parameter to zero.

3. The method of claim 1, wherein the estimating the first optimal correction parameter includes executing a least squares regression on the overlay data.

4. The method of claim 1, wherein the exposure is at a site-level of the first wafer.

5. The method of claim 4, wherein the site-level includes sites for referencing overlay errors.

6. The method of claim 1, further comprising, estimating, by the computing device, a parameter difference between existing correction parameters and estimated correction parameters which are applied to the subset of sites.

7. The method of claim 6, further comprising, estimating, by the computing device, the second optimal correction parameter based on the parameter difference.

8. The method of claim 1, wherein the applying the second optimal correction parameter to the second wafer occurs at a site-level of the second wafer.

9. The method of claim 8, wherein the correction parameter includes at least one of an overlay (OVL) correction, higher order process corrections (HOPC) correction, intra-field higher order process corrections (IHOPC) correction and corrections per exposure (CPE) corrections.

10. The method of claim 9, wherein the OVL correction includes a Y Translation which represents how much a layer of the first wafer was shifted up or down to correct overlay misalignment.

11. The method of claim 1, further comprising determining a registration error at a site-level of the first wafer, wherein the performing of the decorrection of the correction parameter includes setting the correction parameter to zero, and wherein the decorrection is generated from the registration error.

12. A computer program product comprising a computer readable storage medium having program instructions embodied therewith, and the program instructions are readable by a computing device to cause the computing device to:
   perform an exposure with a correction parameter onto a first wafer;
   perform a decorrection of the correction parameter;
   collect overlay data with respect to the decorrection;
   estimate a first optimal correction parameter from the overlay data for sites on a second wafer;
   model a result of the first optimal correction parameter to a subset of the sites;
   estimate a difference for the subset of the sites; and
   estimate a second optimal correction parameter based on the difference.

13. The computer program product of claim 12, wherein the correction parameter includes at least one of an OVL correction, an HOPC correction, an IHOPC correction and a CPE correction.

14. The computer program product of claim 13, wherein the OVL correction, the HOPC correction, the IHOPC correction and the CPE correction are grouped into corrections in an x-direction and a y-direction.

15. The computer program product of claim 12, wherein the difference is calculated by finding a change between the correction parameter and an ideal parameter.

16. The computer program product of claim 12, wherein the exposure occurs at a site-level of the first wafer.

17. A controller for overlay optimization, comprising:
   a CPU, a computer readable memory and a computer readable storage media;
   first program instructions to determine a registration error at a site-level of a wafer;
   second program instructions to generate a decorrection from the registration error;
   third program instructions to apply an estimation function to the decorrection to generate estimated decorrections for a site-level of a second wafer;
   fourth program instructions to dampen corrections which are to be applied to the estimated decorrections at the site-level of the second wafer; and
   fifth program instructions to apply the dampened corrections to the estimated decorrections at the site-level of the second wafer,
   wherein
      the first, second and third program instructions are stored on the computer readable storage media for execution by the CPU via the computer readable memory.

18. The system of claim 17, wherein the generation of the decorrection from the registration error includes setting the registration error to zero.

19. The system of claim 17, wherein the dampened corrections are dampened by 30%.

20. The system of claim 17, wherein the corrections which are dampened include at least one of an OVL correction, an HOPC correction, an IHOPC correction and a CPE correction.

* * * * *